Patented Dec. 26, 1922.

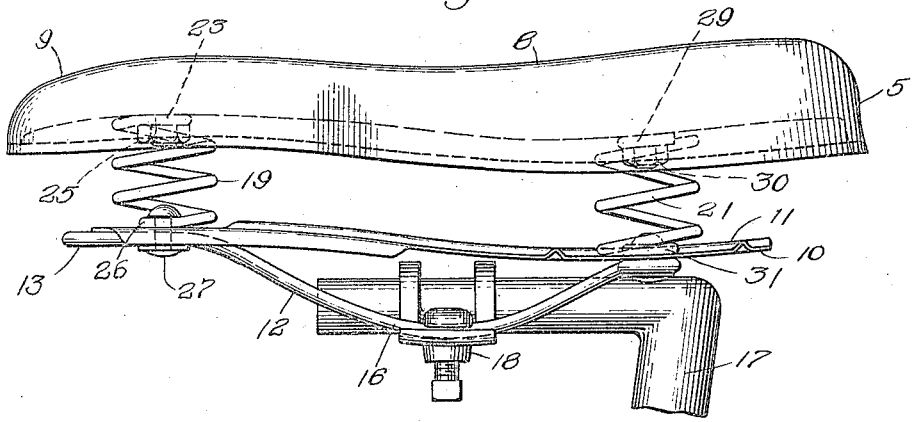
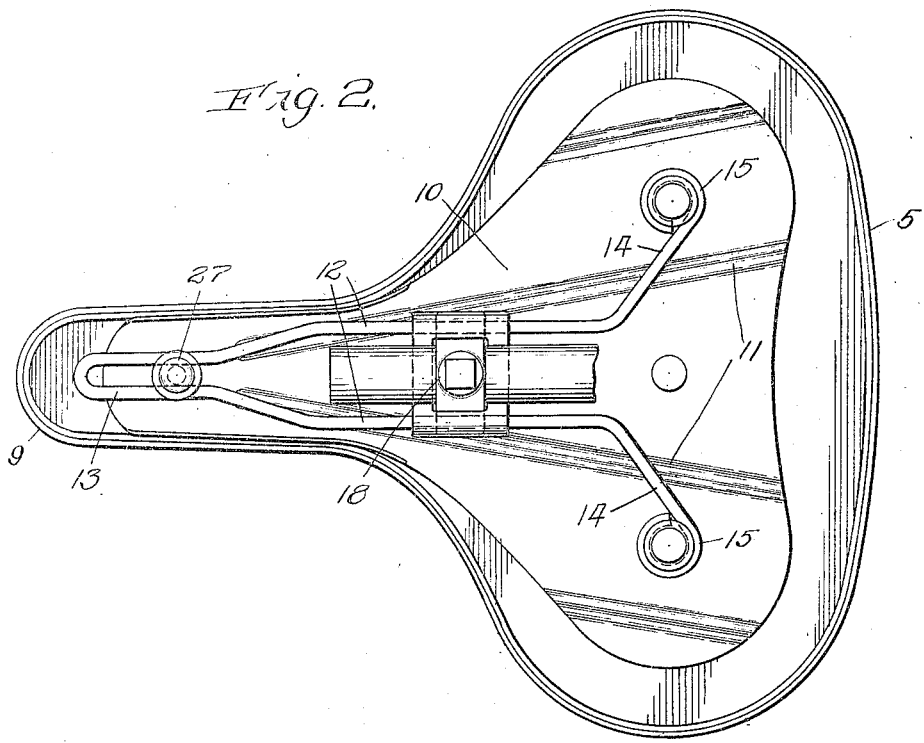

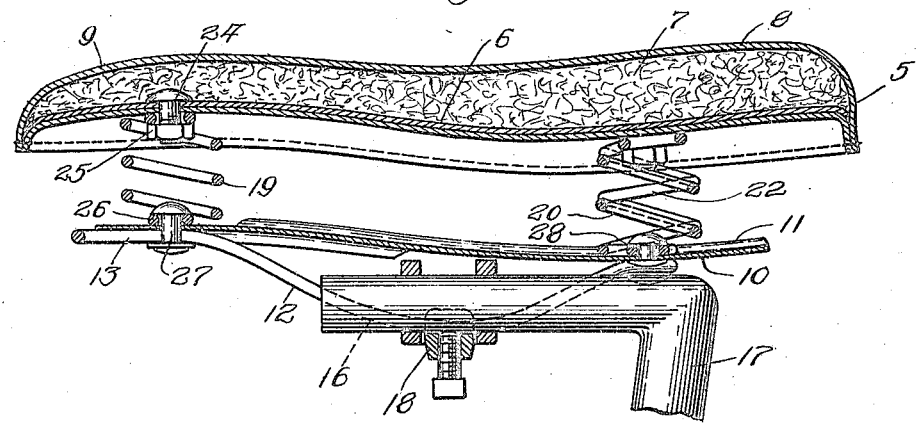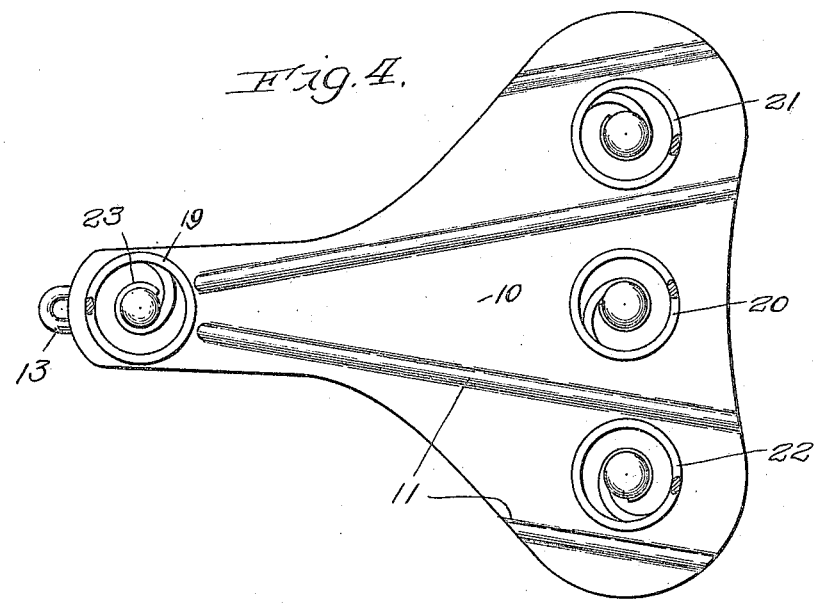

1,440,213

UNITED STATES PATENT OFFICE.

JOHN O. DU BROY, OF LAPORTE, INDIANA, ASSIGNOR TO GREAT WESTERN MANUFACTURING CO., OF LAPORTE, INDIANA, A CORPORATION OF INDIANA.

CYCLE SADDLE.

Application filed October 28, 1921. Serial No. 511,133.

*To all whom it may concern:*

Be it known that I, JOHN O. DU BROY, a citizen of the United States, residing at Laporte, in the county of Laporte and State of Indiana, have invented a new and useful Improvement in Cycle Saddles, of which the following is a specification.

My invention relates, more particularly, to saddles for vehicles propelled by the feet, as for example bicycles and tricycles, and also to motorcycles and the like; and my primary object is to provide a construction of spring supported saddle for use on vehicles of the character above stated, which will afford to the rider of the cycle the maximum of comfort and which in the pedalling of the cycle will move in opposition to the resistance of springs in the direction of the force applied thereto by the action of the legs of the rider in pedalling the cycle, the seat portion of the saddle being preferably so supported that it will have universal yielding movement and cushion the rider against road shocks.

Referring to the accompanying drawings:

Figure 1 is a view in side elevation of a saddle constructed in accordance with my invention, the same being shown as mounted upon a seat post a portion of which latter is broken away. Figure 2 is a bottom plan view of the structure of Fig. 1. Figure 3 is a longitudinal sectional view through the saddle; and Figure 4, a plan sectional view taken through the supporting springs.

In the particular device shown, the seat portion of the saddle is represented at 5, this portion of the saddle being preferably formed of a rigid metal plate 6 forming the base portion of the seat upon which the padding 7 is located, the plate 6 and padding 7 being encased in any suitable flexible material, such as leather, represented at 8.

In accordance with common practice the seat portion of the saddle is formed at its forward end with a horn portion 9, the particular construction of saddle illustrated being designed for men's cycles.

The illustrated construction also comprises a rigid plate 10, shown as struck up to provide the reenforcing ribs 11, this plate being located below the seat portion 5 and to which the supporting member 12 is secured, preferably as hereinafter described. The member 12 is shown as made from a rod bent upon itself to form the loop portion 13 at its forward end, laterally-extending arm portions 14 at its rear end which are bent into eyes 15 and intermediate rod portions 16 shown as slightly downwardly bowed and at which the saddle structure is adapted to be secured to a seat post represented at 17 as through the medium of the clamping device represented at 18 and shown as of common construction.

The seat portion 5 of the device is supported from the described structure beneath it, by means of a plurality of springs, in the particular construction illustrated four of these springs being employed and represented at 19, 20, 21 and 22. The springs 19 and 20 are located at the front and rear portions of the saddle structure in the medial line of the saddle, and the springs 21 and 22 are located adjacent the rear end of the saddle at opposite sides of the medial line thereof, these springs being shown as of the coiled type with their axes extending substantially in a vertical plane. The upper end of the spring 19 is formed into an eye 23 which surrounds the lower threaded end of a bolt 24 confined in openings in the plate 6 and the lower section of the casing 8, a nut 25 screwing up on the lower end of this bolt for firmly clamping in place the upper end of this spring. The lower end of the spring 19 is formed into an eye 26 through which a rivet 27 firmly clamping together the lower end of this spring, the plate 10 and the front end of the member 12, extends. The upper end of the spring 20 bears against the under side of the seat portion of the saddle, and its lower end is formed into an eye, represented at 28, through which a rivet connecting this end of the spring with the plate 10 extends. The upper ends of the springs 21 and 22 are each formed with eyes 29 through which bolts 30 carried by the seat portion, as explained of the bolts 24, extend for rigidly securing in place the upper ends of these springs, the lower ends of these springs 21 and 22 being formed with eyes 31 engaged by rivets as in the case of the rivets 27, and which serve to rigidly connect together the member 12, at its eyes 15, the plate 10 and the springs 21 and 22.

It will be understood from the foregoing that the seat portion 5 of the saddle is free to be depressed and tilted either to one side or the other or tilted lengthwise of the saddle, except as restrained by the springs interposed between it and the under structure, and that by arranging the springs generally as shown the seat portion may be caused to be very sensitive to the exertion of forces tending to tilt it to either side as occur in the pedalling of a cycle, due to the location of the springs 19 and 20 substantially in the medial line of the saddle. Thus there is combined in the saddle the desired cushioning of the seat portion thereof to tilt against a cushioning spring pressure responsive to the force applied to the saddle by the user in pedalling the cycle, it being also understood from the foregoing that the seat portion is adapted to yield downwardly, as well as tilt sidewise, all of which serves to afford to the rider of the cycle the maximum comfort.

While I have illustrated and described a particular construction embodying my invention, I do not wish to be understood as intending to limit it thereto as the same may be variously modified and altered without departing from the spirit of my invention, and in this connection it may be stated that, as will be apparent from the foregoing, I do not intend to limit myself to the particular number, type, or arrangement of springs shown, nor to the provision of a plate as a support for the springs, as the number of springs and their arrangement may be varied and the support be provided in other forms, without departing from the spirit of my invention.

What I claim as new, and desire to secure by Letters Patent, is:

1. A cycle saddle comprising a seat-portion, a support located below said seat-portion, and springs interposed between said seat-portion and support, certain of said springs being located adjacent the front and rear portions of the saddle and substantially at the median line of the latter, and others arranged at opposite sides of the median line of the saddle, said seat-portion being adapted to tilt sidewise and in such tilting being unrestrained except by said springs.

2. A cycle saddle comprising a seat-portion, a plate located below said seat portion and in spaced relation thereto, said plate being provided with means adapting it for attachment to a seat post, and coiled springs connected at their lower ends with said plate-portion and at their upper ends with said seat-portion, certain of said springs being located adjacent the front and rear portions of the saddle and substantially at the median line of the latter and others arranged at opposite sides of said median line, said seat-portion being free to tilt sidewise and lengthwise of the structure except as restrained by said springs.

3. A cycle saddle comprising a seat-portion provided with a horn at its forward end, a support located below said seat-portion, and springs interposed between said seat portion and support, certain of said springs being located adjacent the front and rear portions of the saddle and substantially at the median line of the latter, and others arranged at the rear end of said seat portion at opposite sides of said median line, said seat portion being free to tilt sideways and lengthwise of the structure except as restrained by said springs.

JOHN O. DU BROY.